United States Patent
Ostman

(10) Patent No.: US 7,527,144 B2
(45) Date of Patent: May 5, 2009

(54) IMPACT BED FOR CONVEYOR SYSTEMS

(75) Inventor: Arthur C. Ostman, 5402 Ostman Rd., Mountain Iron, MN (US) 55768

(73) Assignees: Nelson-Williams Linings, Inc., Mountain Iron, MN (US); Arthur C. Ostman, Mountain Iron, MN (US)

( * ) Notice: Subject to any disclaimer, the term of this patent is extended or adjusted under 35 U.S.C. 154(b) by 13 days.

(21) Appl. No.: 11/773,314

(22) Filed: Jul. 3, 2007

(65) Prior Publication Data
US 2008/0006514 A1  Jan. 10, 2008

Related U.S. Application Data

(60) Provisional application No. 60/818,749, filed on Jul. 6, 2006.

(51) Int. Cl.
*B65G 15/08* (2006.01)
(52) U.S. Cl. ..................... 198/823; 198/841
(58) Field of Classification Search ......... 198/823–830, 198/841
See application file for complete search history.

(56) References Cited

U.S. PATENT DOCUMENTS

| 4,215,776 | A | * | 8/1980 | Esler | 198/823 |
| 4,793,470 | A | | 12/1988 | Andersson | |
| 4,898,272 | A | * | 2/1990 | Swinderman et al. | 198/841 |
| 5,038,924 | A | | 8/1991 | Stoll | |
| 5,799,780 | A | * | 9/1998 | Steeb et al. | 198/823 |
| 5,988,360 | A | * | 11/1999 | Mott | 198/823 |
| 6,368,154 | B1 | * | 4/2002 | Hirata et al. | 439/609 |
| 6,454,083 | B2 | * | 9/2002 | Burkhart et al. | 198/823 |
| 6,913,138 | B2 | * | 7/2005 | Wiggins | 198/841 |

OTHER PUBLICATIONS

"Precision Impact Products". Precision Pulley & Idler brochure. May 2005. 4 pages. Pella, IA.

* cited by examiner

*Primary Examiner*—Mark A Deuble
(74) *Attorney, Agent, or Firm*—Thomas J. Nikolai; Nikolai & Mersereau, P.A.

(57) ABSTRACT

An impact bed for use with belt conveyors comprises a base frame having parallel, spaced-apart side members extending lengthwise where the side members have an arcuate, concave upper edge. Attached to the upper edge of the side members is an arcuate, concave plate having plural rows, each of a plurality of apertures or alternatively a plurality of tubes or channels having apertures may be used. Completing the assembly are a plurality of polymeric bars, with a smooth upper surface and a plurality of lugs dimensioned and spaced to fit into the plurality of apertures of one of the plural rows. The apertures and lugs are designed to interlock with one another such that no special tools are needed to remove the bars form the top plate when the bars become worn out. Channels having flex points may be used to support the bars. Idlers may be used on the supports.

31 Claims, 6 Drawing Sheets

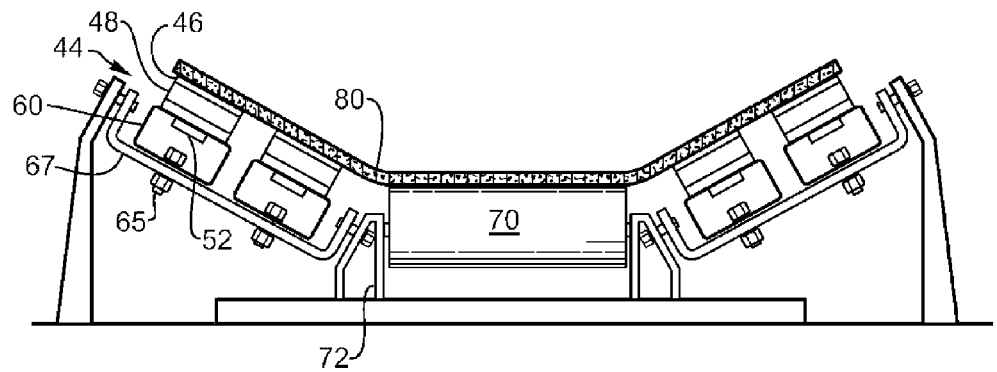
FIG. 5
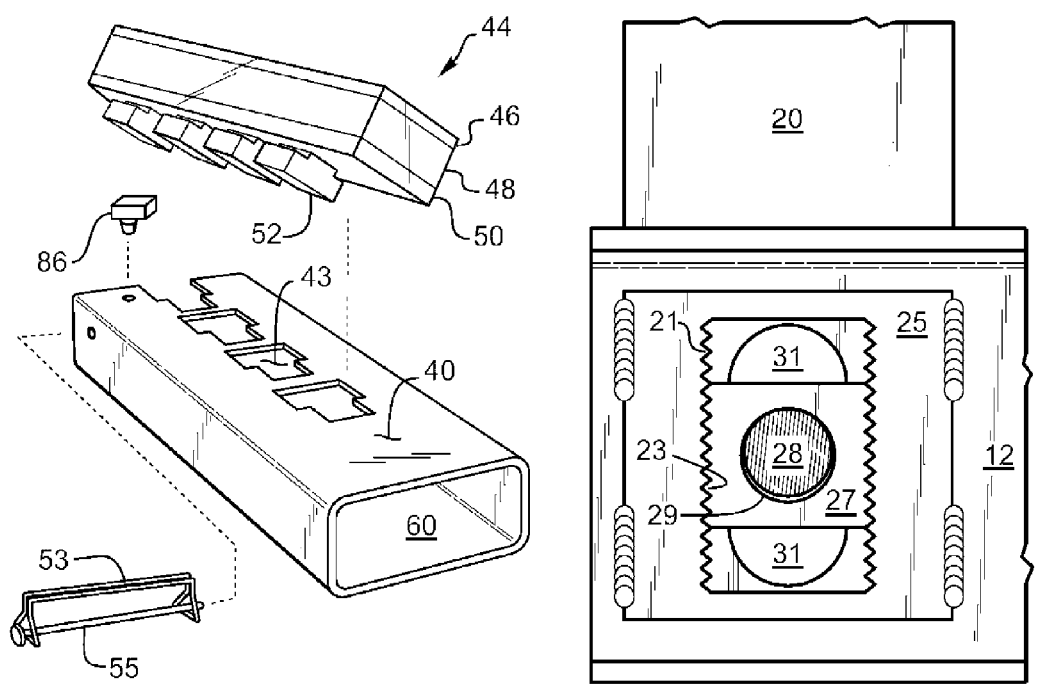
FIG. 6
FIG. 7

IMPACT BED FOR CONVEYOR SYSTEMS

CROSS-REFERENCE TO RELATED APPLICATIONS

The present application claims priority to U.S. Provisional Application Ser. No. 60/818,749, filed Jul. 6, 2006, the contents of which are incorporated by reference.

BACKGROUND OF THE INVENTION

1. Field of the Invention

This invention relates generally to conveyor systems principally used in the mining and material handling industry, and more particularly to the design of conveyor loading zones, conveyor impact beds often referred to as an "impact saddle" often used to support a conveyor belt at a point where soil, rocks, gravel and other material drop onto a conveyor belt.

2. Discussion of the Prior Art

In the mining industries, conveyor systems are often used to move bulk material comprising dirt, ore, coal, tailings, etc. from one point to another. The bulk material may be dropped on to the moving conveyor belt from the bucket of a large power shovel or from the box of a dump truck from a considerable height above the level of the conveyor belt. Where the material to be conveyed includes heavy rocks and even boulders or the like, the impact of such objects striking the conveyor can rapidly damage a conveyor belt unless it is adequately supported from below.

To address this problem, conveyor system manufacturers produce and sell impact saddles to be used in heavy impact areas in which idler rollers are mounted in a frame so as to be rotatable by the friction drag imparted by the underside of the conveyor belt which the impact saddle supports.

When transporting loose materials, such as sand, gravel, dirt and rocks, the conveyor belt preferably has a concave curvature and, hence, the rollers comprising the impact saddle include a roller mounted on a horizontal axis and two side rollers that are inclined to the axis of the bottom roller. This configuration necessarily causes pinch points between the inclined rollers and the horizontal one. Such pinch points often result in premature belt failure.

Other known prior art impact cradles consist of a plurality of impact bars bolted to a framework which support a conveyor belt in generally the same shape as the conveyor idlers on the conveyor. The impact bars usually consist of extruded aluminum or formed steel "T" channels molded into a rubber or polymer impact absorbing material having a UHMWPE or Teflon upper sliding surface on which the conveyor slides. "T" bolts or other types of threaded fasteners are inserted into the "T" channel to fasten the bar to the underlying conveyor structure. A typical impact cradle of this type is shown in Andersson, U.S. Pat. No. 4,793,470 issued Dec. 27, 1988.

Other impact/slider bars may have no internal metal "T" slot and may be manufactured of a 100% polymer material, but still utilize a "T" slot molded into the bar in which a fastener is inserted to attach to the bar to the underlying conveyor structure. Some other systems are attached by drilling a hole through the impact bar and fastening the bar to the underlying conveyor structure with a countersunk bolt or fastener and then plugging the surface of the hole with a UHMW cap or another polymer material.

The problem with attaching impact bars with fasteners, nuts, bolts, etc., is that they are labor intensive to install and maintain, they can vibrate loose, rust or corrode and removing them often takes a cutting torch which can result in fires and added expense. Also, when there is internal metal in an impact/slider bar, if a conveyor wears through the polymeric sliding surface, metal may be exposed which may cause wear or grooving of the underside of the conveyor belt. Prior art impact and slider bars with internal metal are also more expensive to manufacture as more steps are needed to bond the metal to the polymer and metal add to the cost. Impact bars without metal are easier to recycle and less costly to dispose of. With many governmental agencies requiring separating of different types of materials that have to be disposed of for recycling or proper disposal, the present invention can provide substantial cost savings over many of the prior art systems.

Another type of impact cradle is shown in the Stoll/Richwood Industries U.S. Pat. No. 5,038,924, issued Aug. 13, 1991. Richwood uses a fastenerless system in which support frames, mounted in a transverse relation to the conveyor belt, are designed to support polymeric segments that are threaded onto the frames to support the conveyor and act as a wear and impact surface. This system has advantages over some of the prior art as it eliminates the use of many of the troublesome fasteners, but it still has shortcomings in that it is not easy to inspect worn segments, is not easily adjustable for wear or is not easily adaptable to many of the low profile or specially designed conveyor systems (e.g. underground coal mining tailpiece loading stations) in the conveyor and material handling industry. The segments are also sometimes difficult to slide on as the friction between the often heavy belt, the segments and the mounting frame has to be overcome when threading the segments onto the frame.

SUMMARY OF THE INVENTION

The present invention provides an improved impact and slider bar design and mounting method that can be adapted to a wide variety of conveyor loading zones, impact zones and slider beds. The impact bars can be easily and quickly installed, removed or maintained without tools or fasteners in a fraction of the time when compared to most of the prior art systems now used. The design of the present invention allows the impact slider bars to be securely attached to the corresponding surface without any internally molded metal channels as in prior art systems. The composite or polymer impacting bars are sufficiently flexible so that they can conform to a variety of concave or convex or irregular surfaces. This is a great advantage over prior art systems, especially in designing transition areas for conveyor loading zones. Transition areas typically occur at elevation changes (e.g., between a tail-pulley of a first conveyor and the first troughing idlers of a second conveyor, or between horizontal runs and inclined runs of a conveyor system).

The improved invention consists of an impact slider bar with an upper exposed portion consisting of a low friction polymer sliding surface, an intermediate cushioning layer for impact resistance and a lower attachment layer with a plurality of lugs projecting outwardly from the bar's lower surface. The lower attachment layer preferably consists of a fiber-reinforced rubber material in the 80 to 90 durometer range. Other comparable hardness polymers such as a polyurethane compound may be used.

The lugs of the impact slider bar correspond with and fit into a row of apertures in an arcuate mounting plate, surface or channel. The apertures in the mounting plate, surface or channel are preferably "T" shaped slots that are formed through the thickness of the channel. The lugs on the lower attaching surface of the impact bar are generally rectangular in cross section but are undercut along opposed sides thereof. This allows the lugs to be inserted into the corresponding T-shaped apertures at the top of the "T" and then displaced longitudinally so that the bars become captured in the stem of the "T", locking the slider bars to the arcuate steel mounting plate in parallel rows. A locking mechanism on the underside of the mounting plate, such as a strap inserted into a recess on one side with a hitch pin on the other, can be used to prevent the bar or bars from sliding back out if desired. The locking mechanism would hold one or more of the "T" lugs of the impact bars into the narrow stem portion of the "T" apertures in the mounting plate.

The invention can be adapted to be used with U-channel retrofit systems, curved profile systems, drop-down wing type systems, simple flat plates for flat conveyors, or a curved profile mounting plate consisting of a press-broken or rolled plate formed to achieve the desired curve to match the trough of the conveyor with which the impact saddle is to be used.

The flexibility of the impact/slider bars of the present invention is of great advantage when a change of elevation or angle is needed at a transition zone, e.g. between the tail pulley and the impact zone at a conveyor loading zone. Here, the mounting plates or surfaces can be "hinged" allowing the curvature to be adjusted to varying angles to conform to the belt as the angle between the tail pulley and load zone changes. The improved impact bar, with no internal metal, can easily be made to conform to different conveyor curvatures as the mounting surfaces are pivoted at the "hinged" locations.

DESCRIPTION OF THE DRAWINGS

The foregoing features and advantages of the invention will become apparent to those skilled in the art from the following detailed description of a preferred embodiment, especially when considered in conjunction with the accompanying drawings in which like numerals in the several views refer to corresponding parts.

FIG. 5 is a cross sectional end view of a conveyor system.

FIG. 6 is a perspective view of a tube and elastomeric bar.

FIG. 7 is a front view of an adjustment device.

DESCRIPTION OF THE PREFERRED EMBODIMENT

Figure 1:
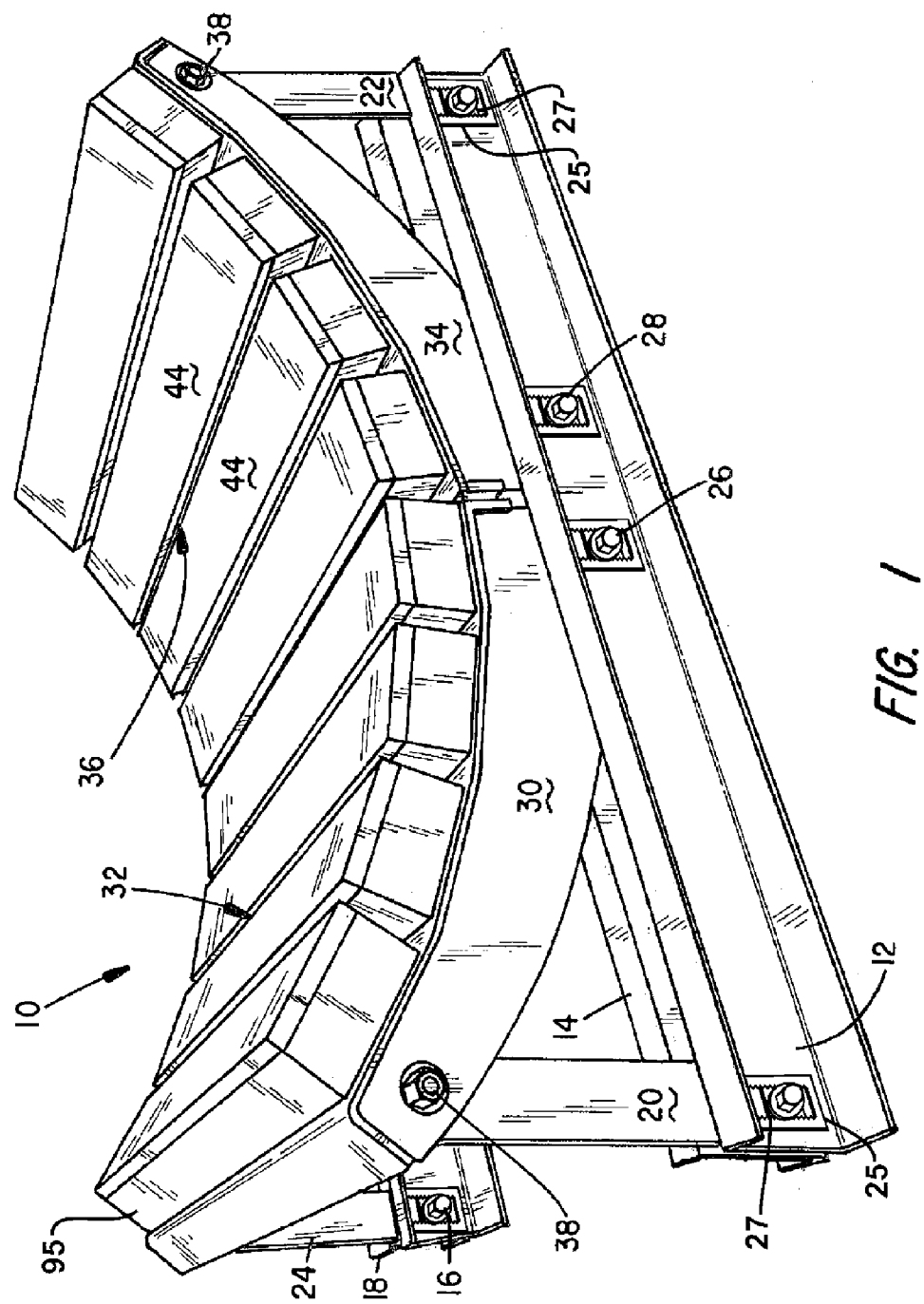
FIG. 1 is a perspective view of a preferred embodiment of the impact saddle of the present invention.

Referring first to FIG. 1, there is indicated generally by numeral 10 an impact bed constructed in accordance with the present invention. It is seen to comprise a base made up of first and second pairs of steel channel members or base rails, the first pair including channel members 12 and 14 and the second pair including channel members 16 and 18. These channel members extend horizontally the width dimension of the impact bed. Sandwiched and clamped between the channels 12 and 14 are upwardly projecting legs 20 and 22. Likewise, clamped between the channel members 16 and 18 are an upright leg 24 and another leg that is hidden from view in FIG. 1, but which extends directly across from the leg 22.

Figure 2:
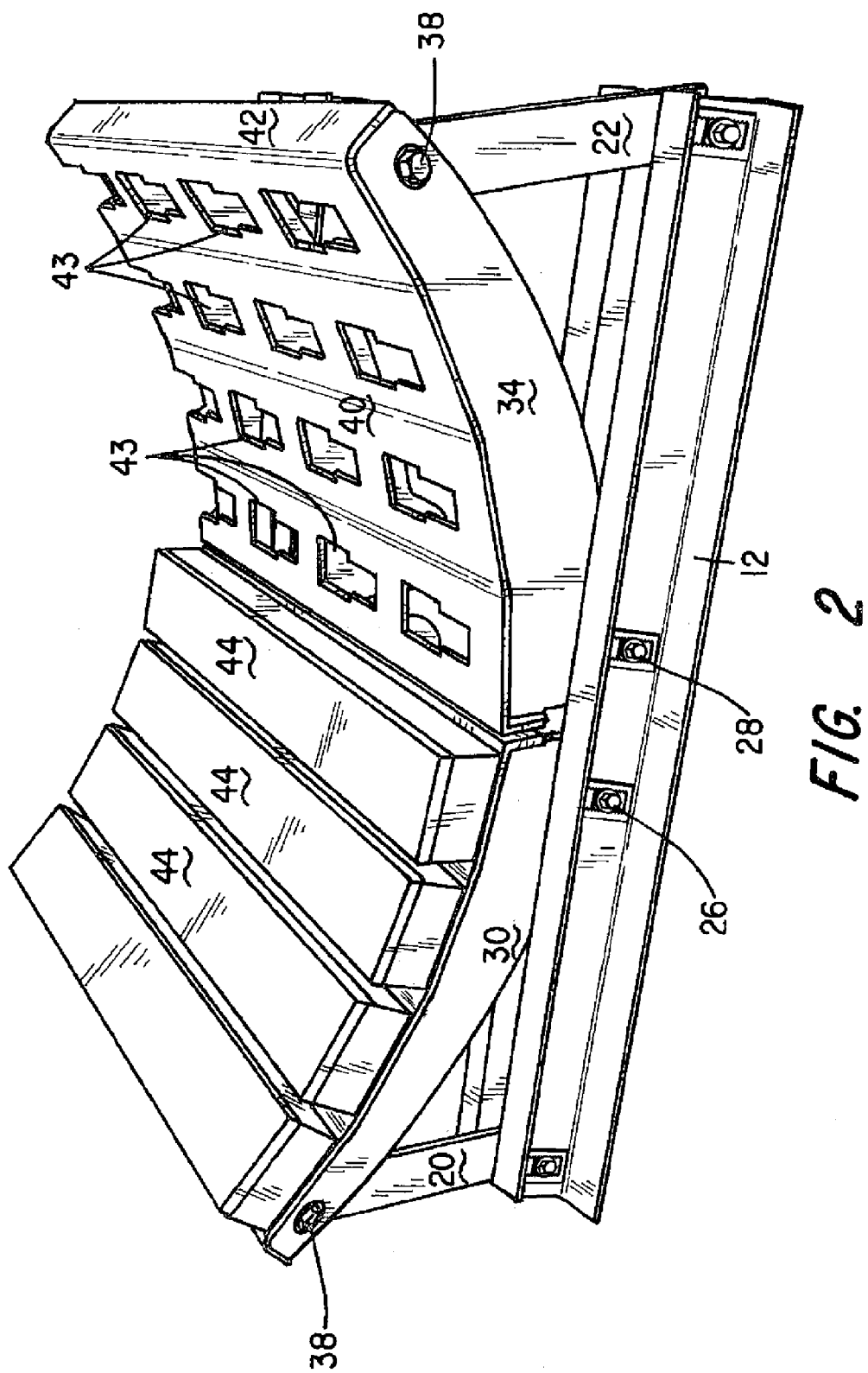
FIG. 2 is a perspective view of the impact saddle of the FIG. 1, but with several bars removed.

Channel members 12, 14, 16, 18, are used to support arcuate side plates 30 and 34. As best seen in FIG. 7, in order to adjust the height of arcuate plates 30 and 34 adjustment devices 25 are attached to the channel members 12, 14, 16 and 18. The channels have oblong apertures 31 cut in them. The height adjustment devices 25 having teeth 21 are attached to the channels. Plate 27 having teeth 23 are inserted into adjustment device 25 at the desired height and their teeth 21, 23 engage to prevent vertical movement of plate 27 in plate 25. In this manner it is easy to adjust the height of bolt holes 29 and thus the height of the ends of side members 30 and 34 which are secured by bolts 26, 28, and 38 as seen in FIGS. 1 and 2.

Figure 8:
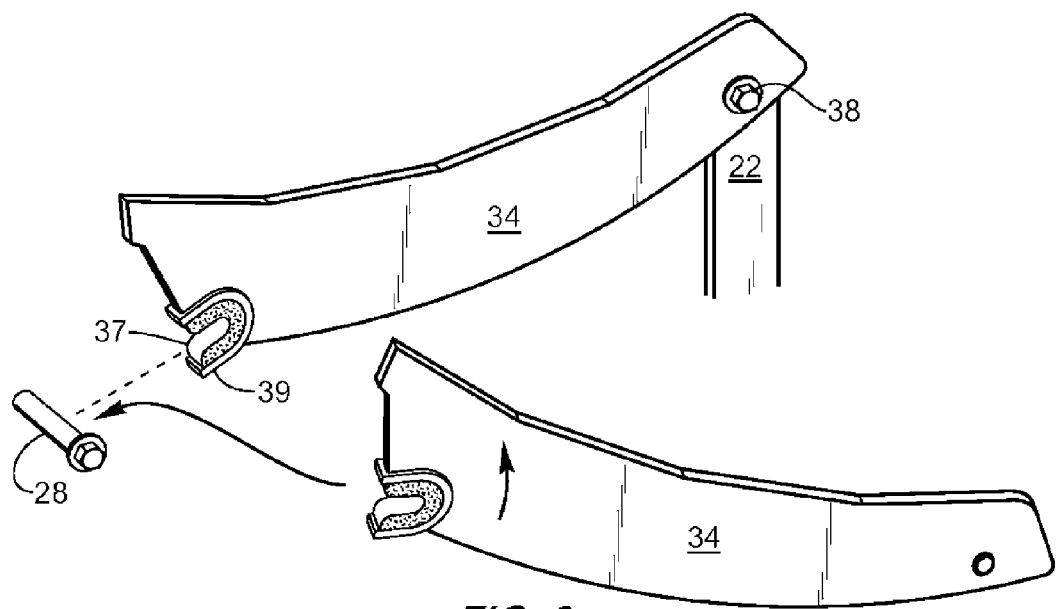
FIG. 8 is a perspective view of the side member attachment method.

Side members 30 and 34 have a horse shoe bolt engaging member 39 for engaging bolts 26 and 28, as best seen in FIG. 8. When it is desired to attach or remove the saddle segments 32, 36, or elastomeric bars 44, the saddle segments can be slid into or out of the impact bed 10 with side members 30 or 34 sliding between channel members 12, 14, and 16, 18 while the side members 30, 34 laying down until the open end of the house shoe bolt attachment 39 engages one of bolts 26 or 28. Then the side member 30 or 34 is lifted at the other end and bolted with bolt 38 to one of legs 20 or 22. When lifted the horse shoe opening is angled downward and the legs 20, 22 are attached preventing the horse shoe opening from lifting off of the bolts 26, 28. It is preferred to have a rubber cushion 37 in the house shoe bolt attachment 39 for engaging bolts 26 or 28. As seen above the height of the legs 20, 22 and the height of bolts 26 and 28 are adjustable on the channel members 12, 14, 16 and 18 by the attachment plates 25 and plates 27. In this manner the saddle segments 32, 36 are quickly and easily installed and adjusted to the desired height. Similarly the saddle segments can easily be removed access to the elastomeric bars 44 for maintenance and replacement.

Although not seen in the view of FIG. 1, side members along the rear edges of the saddle segments 32 and 36 are captured between the channel members 16 and 18 and held by bolts in the same way that the arcuate side members 30 and 34 are secured to the channels 12 and 14.

The outer end of the side member 30 is fastened to the upper end of the leg 20 by a bolt 38 and, similarly, the outer end of the side plate 34 is bolted to the upper end of the leg 22. In an identical manner, the outer ends of the rear side plates are secured to the upwardly extending legs, as at 24.

Referring now to FIG. 2, each of the saddle segments 32 and 36 includes a concave steel plate 40, that is rolled or otherwise formed so as to conform to the contour of the upper edges of the arcuate side plates 34, and the end portion 42 thereof is bent downward so as to abut the end edges of the side plates. The plate 40 is preferably welded along the opposed edges thereof to the end plates 34. It is preferred that each segment of plate 40 containing a row of apertures 43 be flat to hold the bars 44 flat. The segments have a bend therebetween thus approximating a curved concave surface.

Laser-cut or otherwise formed through the thickness dimension of the arcuate plate 40 are a plurality of apertures of a predetermined shape with T-shaped apertures 43 being preferred. The apertures are here shown as arranged in parallel rows of three apertures each. In the embodiment shown the first aperture 43 in each row extends inward from the end of the support which can be the curved plate 40 or the tube 60. The apertures in each row are spaced apart by the same predetermined distance and are used to secure elastomeric bars 44 to the exposed upper surface of the panels 40 in a manner to be described below. In addition to tubes 60, channels 64, essentially half tubes, can be used instead of tubes to support apertures 43 as shown in FIGS. 4, 10, 11, and 12.

Figure 3:
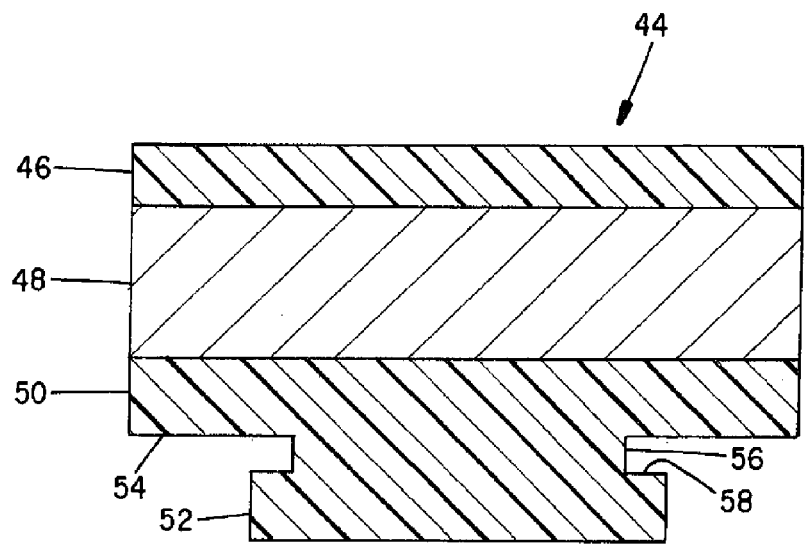
FIG. 3 is a cross-section taken through one of the bars.

The bars themselves may be constructed as illustrated in the cross-sectional view of FIG. 3. Each of the bars 44 is preferably, but not necessarily, of a laminated construction wherein a first layer 46 may comprise an ultrahigh molecular weight (UHMW) polymer, such as polyurethane or polyethylene. The layer 46 is adhered to a cushioning layer 48 which may typically have a durometer rating in the range of from 40-60 Shore A. The UHMW layer 46 may be either cold-bonded to the cushioning layer 48 with a suitable adhesive or, alternatively, the two layers may be vulcanized-bonded in a hot press. The cushioning layer 46 is also appropriately bonded to a base layer 50 which is preferably a harder polymer that is impregnated with fibers to give it an increased strength and tear resistance. Rather than having the described laminated construction, the bars may also be a solid polymer, such as polyurethane or polyethylene.

Formed on the undersurface of the bars 44 are a plurality of projections, as at 52, equal in number to the number of apertures in a given row of the apertured plate 40. The lugs 52 project downward from the undersurface 54 of the bar 44 and are undercut as at 56 along side edges thereof to define shoulders 58.

The lugs 52 have a length and a width dimension allowing them to readily pass through the head portion of the T-shaped slots. Now, when the bar is displaced along its longitudinal axis, the lug 52 will be captured in the stem of the "T" in that the edges defining the stem of the "T" project into the undercut area 56 of the lugs. The bars become locked to the apertured plate 40. While projections of rectangular cross-section for fitting into "T" slots is preferred, other shapes can be used as well, so long as the apertures include an opening of a predetermined size contiguous with a slot whose width is less than the size of the opening and the projection has a neck zone for fitting into the slot.

Figure 9:
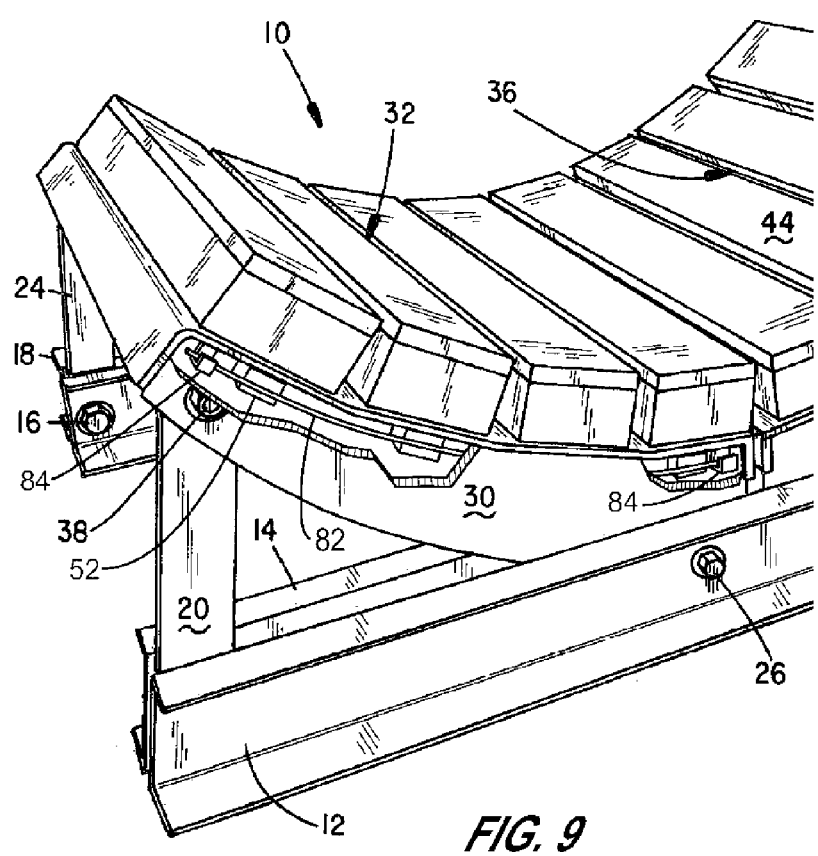
FIG. 9 is a side cut-a-way view of the side member showing the locking bar in the impact bed.

The lugs 52 can be locked in place by bar 82 inserted into brackets 84 as shown in FIG. 9 such that bars 44 will not slide out of slots 43.

In use, the impact bed 10 is placed beneath a conveyor belt with the belt running parallel to the length dimension of the bars 44. The impact bed is positioned such that the stems of the T-notches are oriented in a downstream direction, such that friction between the moving conveyor belt and the bars tends to urge the bars deeper into the stem of the "T".

When the bars become worn, removal and replacement thereof can be accomplished without need for any special tools. A maintenance person need only strike the bars with the heel of his hand in an upstream direction relative to the conveyor belt until the lugs 52 are again aligned with the head portion of the T-shaped aperture. This then allows the bar to be lifted free from the arcuate panels 40 of the impact bed frame and replaced with another.

In order to have easy access to the bars 44 the legs 20, 22 can be detached by removing bolts 38 and the side members 30, 34 can be lowered providing more space between the bars 44 and the conveyor belt for easier removal of the worn bars 44 and easier replacement with newer bars. Increased access to the bars 44 particularly near the horse shoe bolt attachment 39 end of saddle segments 32, 36 can be had by removing bolts 26 or 28, disconnecting the legs 20, 22 and sliding the saddle segments out from under the conveyor belt 80.

In another embodiment as shown in FIG. 5 a conveyor system having standard rollers 70 supported on brackets 72 supports the conveyor belt 80. However rather than having rollers on the sides of the belt 80 a sliding surface 46 on top of elastomeric bars 44 is used to support belt 80. The cross section of the elastomeric bar 44 is shown in FIG. 3. In this embodiment the elastomeric bar 44 engages a tube 60 having slots 43 as shown in FIG. 6. The tubes 60 can be rectangular tubes which engage the T shaped projections 52 under elastomeric bars 44 as shown in FIG. 6. The projections 52 lock the elastomeric bar 44 in place when inserted into the T shaped head and moved to the stem of the T shaped slot. A pin 55 can be inserted into the tube 60 to lock the elastomeric bars in place. A wire 53 may be used with the pin 55 to secure the pin in the tube 60. Alternatively a plug 86 can be inserted in an aperture behind bar 44 to lock it in place.

The tube 60 can be placed on a bracket 67 at the end of leg 20 to hold the tube 60 in the desired location for supporting belt 80. The brackets 67 may be adjustable to hold the tubes 60 in the desired place. The brackets 67 may be wider than shown and hold two or more tubes 60. The tubes 60 can be attached to the brackets 67 by bolts 65 accessible through slots 43.

The elastomeric bars 44 may be easily and quickly installed or removed from slots 43 in tubes 60 and replaced when they become worn.

The tubes 60 can also be placed on the sides of a conveyor belt 80 where the impact saddle has a base with side members 30, 34 but requires further support on the sides as provided by tubes 60 in FIG. 5 where the rollers 70 are replaced by side members 30, 34.

Figure 10:
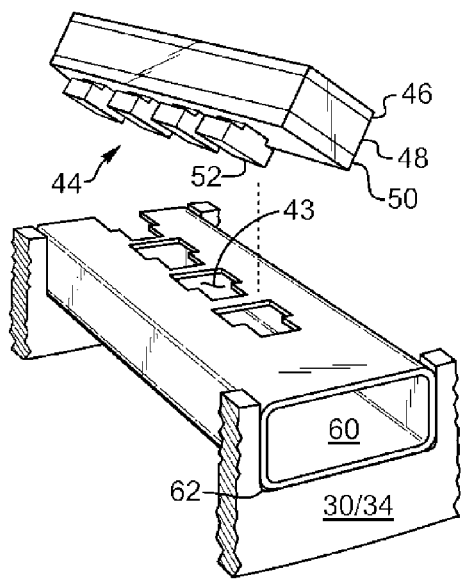
FIG. 10 is a section of the impact saddle of the FIG. 1, with a plurality of tubes replacing the plate.

In an alternative embodiment shown in FIG. 10 side members 30, 34 have indented slots 62 for inserting tubes 60 to form a strong support structure for holding bars 44 in place.

Figure 4:
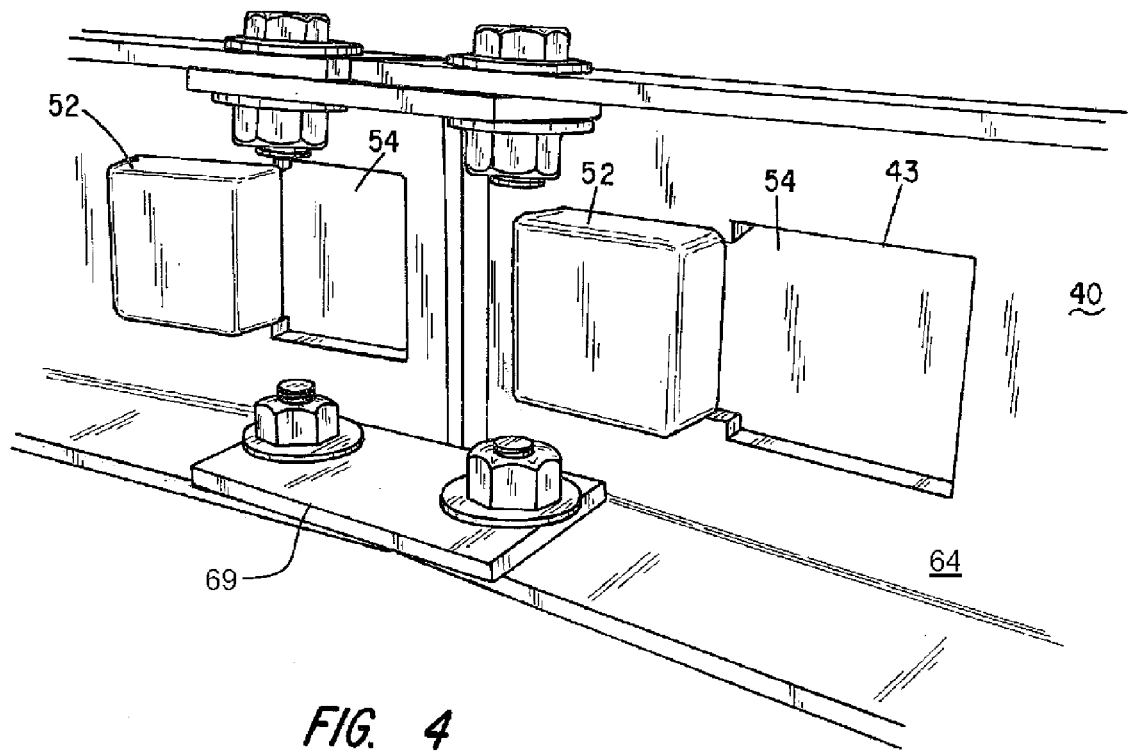
FIG. 4 is a bottom view of a mounting plate with a slider bar attached.
Figure 11:
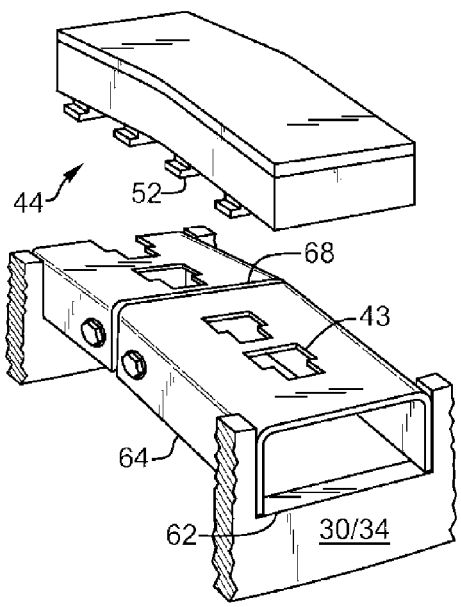
FIG. 11 is a section of the impact saddle of the FIG. 1, with a plurality of channels with flex points replacing the plate.

In another alternative embodiment as shown in FIG. 11 tubes 60 are replaced by C-shaped channels 64. The channels 62 may have one or more flex points where the channels are joined together as shown at FIG. 4. In FIG. 4 the plates 69 joint C-shaped channels 64 together at selected adjustable angles. Alternatively the channels 64 may be permanently attached such as by welding at predetermined angles. As shown in FIG. 11 the angle the channels come together at form an apex at the flex point 68. This can be used where for example a conveyor belt has a change of direction from going uphill at one rate of inclination to another rate of inclination or for a flex point of a conveyor belt going from uphill to downhill. Obviously the flex point can be angled the other way so that instead of an apex a trough is formed. There may be more than one flex point 68 along the bars 44 for a smother transition in changes of direction. The bars 44 are flexible and can be installed or removed without changing the angles on the channels 64 or the channels 64 can be made flat for easier installation or removal of the bars 44.

Figure 12:
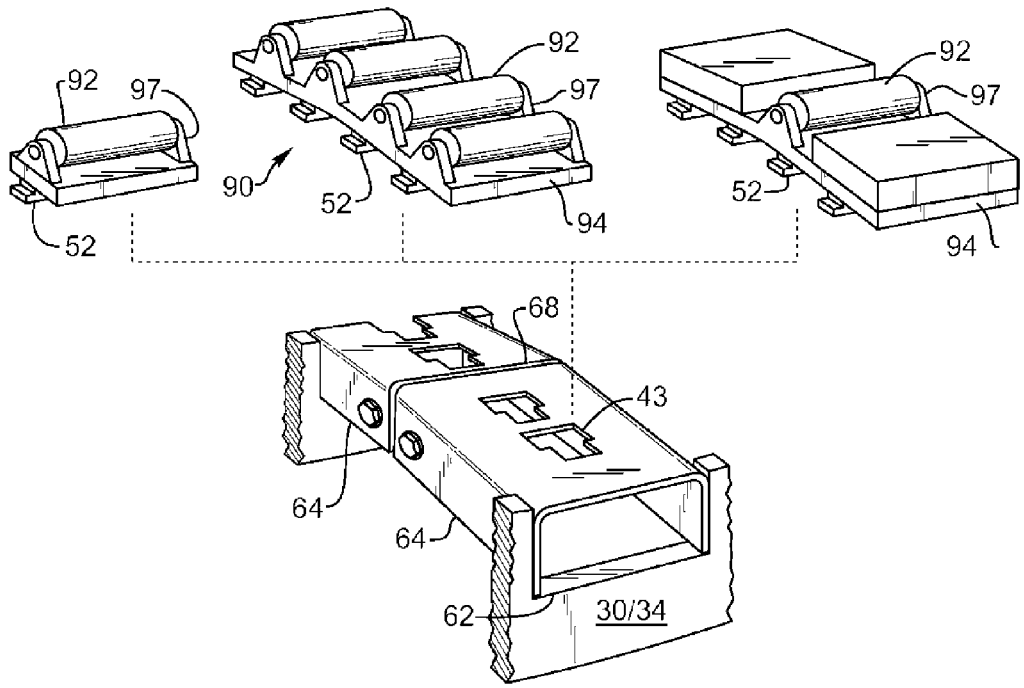
FIG. 12 is a section of the impact saddle having bars with idlers.

In another embodiment idlers 92 can replace the top surface of bars 44. As shown in FIG. 12 the bar 94 can have a plurality of idlers on it or alternatively one idler in the section over one lug for installing one idler at a time with the remainder of the row of slots having a bar with a smooth top surface. Or one idler 92 can be at a flex point on the bars 44.

The idlers 92 are supported on arms 97 attached to a base 94 having lugs 52 as in a standard bar.

The idlers 92 on the outside edges of the conveyor belt 80 can support the conveyor at a different angle for additional material handling ability of the conveyor belt system.

In other embodiments idlers 92 can be used bars 44 on the outside most bars 95 as shown in FIG. 1 under conveyor belt 80. The outer most bar 95 may be angled at a steeper angle such that the belt is flexed more and idlers 92 are required.

The impact bed may have various combinations of bars with smooth surfaces, bars with idlers, bars held by tubes with apertures, channels with apertures or sheets with apertures. The impact beds may have central portions with rollers or idlers thereunder or the elastomeric bars with a smooth surface. Many different combinations are possible depending on the needs of the conveyor system.

It can be seen, then, that the present invention provides an impact bed for a conveyor system that does not require bolts or any other metal fastening mechanisms built into the bars. This feature permits more environmental-friendly disposal in that the elastomeric material employed can be recycled. Moreover, because the absence of such metal parts as metal T-channels and T-bolts, there is less of a chance of sparks being generated upon impact by a boulder, sparks could be a problem in the coal mining application where methane gas buildup is frequently a problem.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A conveyor system comprising:
   at least one elastomeric bar having a smooth flat upper surface and a bottom surface with integrally formed, downward extending projections and lateral shoulders at the base of the projections,
   a support having a surface and apertures with different widths along the aperture length for accepting the projections on the bottom surface of the bar therethrough for supporting the elastomeric bar and holding the elastomeric bar in place, and wherein the bar is longitudinally displaceable in the aperture such that the shoulders engage the base of the support surface on a portion of the aperture with a narrower width,
   a frame having a height adjustment for holding the support at an angle and height such that the elastomeric bar surface is adapted to engage a conveyor belt along a belt undersurface to support the conveyor belt in a desired position.

2. A conveyor system as in claim 1 wherein,
   the frame has a pair of spaced apart vertically extending side members;
   the support surface has a top plate supported by the frame atop said side members, the top plate further having a concave curvature with the apertures aligned in plural rows, the apertures extending through a thickness dimension of the top plate, a predetermined spacing between said apertures; and
   a plurality of bars, equal in number to the plural rows, said bars being of a generally rectangular cross-section having said smooth upper surface and a plurality of said integrally formed projections extending downward from a bottom surface thereof, where a spacing between projections corresponds to the predetermined spacing between the aligned apertures formed in the top plate, said projections on each bar filling through ones of the aligned apertures.

3. The conveyor system as in claim 2 wherein the bars comprise an ultra high molecular weight polymer.

4. The conveyor system as in claim 3 wherein the polymer is one of polyethylene and polyurethane.

5. The conveyor system as in claim 2 wherein the apertures include an opening of a predetermined size and shape contiguous with a slot of a predetermined length and of a width that is less than the size of the opening.

6. The conveyor system as in claim 3 wherein the bars include a cushioning layer bonded to the high molecular weight polymer.

7. The conveyor system as in claim 6 wherein the bars further comprise a base layer bonded to the cushioning layer, said base layer including reinforcing fibers in a polymer binder.

8. The conveyor system as in claim 2 wherein the apertures are generally "T" shaped.

9. The conveyor system as in claim 8 wherein the projections are of a rectangular cross-section and include a neck zone of a width corresponding to a width of a stem portion of the "T".

10. The conveyor system as in claim 2 wherein the side members are arcuate and are supported at opposed ends by vertically extending legs, a top edge of each side member having a concave profile corresponding to that of the top plate and with the top plate being welded to the lop edges of the side plates.

11. The conveyor system as in claim 10 wherein the side plates each comprise a pair of arcuate segments having ends thereof joined together in pairs by bolts.

12. The conveyor system as in claim 10 wherein the vertically extending legs supporting each side plate are clamped at a lower end thereof between a pair of horizontally extending base rails.

13. The conveyor system as in claim 1 wherein, the support being a rectangular tube or a channel.

14. The conveyor system as in claim 13 wherein the bars comprise an ultra high molecular weight polymer.

15. The conveyor system as in claim 14 wherein the polymer is one of polyethylene and polyurethane.

16. The conveyor system as in claim 13 wherein the apertures include an opening of a predetermined size and shape contiguous with a slot of a predetermined length and of a width that is less than the size of the opening.

17. The conveyor system as in claim 16 wherein the projections on the bars are sized to pass through the openings of the apertures and include a zone of a lesser size corresponding to the width of said slot whereby the projections are insertable through the openings and longitudinally displaceable in the slots to lock the bars to the top plate.

18. The conveyor system as in claim 13 wherein the bars include a cushioning layer bonded to the high molecular weight polymer.

19. The conveyor system as in claim 18 wherein the bars further comprise a base layer bonded to the cushioning layer, said base layer including reinforcing fibers in a polymer binder.

20. The conveyor system as in claim 13 wherein the apertures are generally "T" shaped.

21. The conveyor system as in claim 20 wherein the projections have rectangular cross-section and include a neck zone of a width corresponding to a width of a stem portion of the "T".

22. The conveyor system as in claim 13 wherein a pin inserted in an aperture in the tube engages the projection and prevents movement of the elastomeric bar relative to the tube.

23. The conveyor system as in claim 22 wherein a wire attached to the pin engages the tube to secure the pin in the tube or channel.

24. The conveyor system as in claim 13 wherein a plug inserted in an aperture in the top of the tube engages the bar to secure the bar in the tube.

25. The conveyor system as in claim 2 wherein a plug inserted in an aperture in the top plate engages the bar to secure the bar in the top plate.

26. The conveyor system as in claim 2 wherein, a bar extending along the side members and supported by brackets proximate each end of the side members is supported adjacent the lugs of the bars to prevent the bars from moving in the apertures thus locking the bars in place.

27. The conveyor system as in claim 2 wherein, the side members have a horseshoe bolt engaging opening at one end.

28. The conveyor system as in claim 1 wherein, the height adjustment has an adjustment device with a rectangular cut out having teeth on the internal vertical sides and a plate with teeth on its sides, sized to engage the internal vertical sides of the adjustment plate, the plate having an aperture for a bolt, such that the height of the bolt bole can be adjusted vertically.

29. The conveyor system as in claim 1 wherein, the support being a channel with at least two portions connected at a flex point to change the direction of the channel at the flex points.

30. The conveyor system as in claim 1 wherein, an idler attached to an elastomeric material having a top surface and a bottom surface with downward extending projections and lateral shoulders at the base of the projections, wherein the shoulders engage the base of the support surface on a portion of the aperture with a narrower width.

31. The conveyor system as in claim 30 wherein, the elastomeric material has more than one idler attached.

* * * * *

UNITED STATES PATENT AND TRADEMARK OFFICE
CERTIFICATE OF CORRECTION

| | |
|---|---|
| PATENT NO. | : 7,527,144 B2 |
| APPLICATION NO. | : 11/773314 |
| DATED | : May 5, 2009 |
| INVENTOR(S) | : Arthur C. Ostman |

It is certified that error appears in the above-identified patent and that said Letters Patent is hereby corrected as shown below:

Claim 2, column 7, line 62, change "filling" to -- fitting --.

Claim 10, column 8, line 22, change "lop" to -- top --.

Signed and Sealed this

Sixteenth Day of June, 2009

JOHN DOLL
*Acting Director of the United States Patent and Trademark Office*